Figure 1:
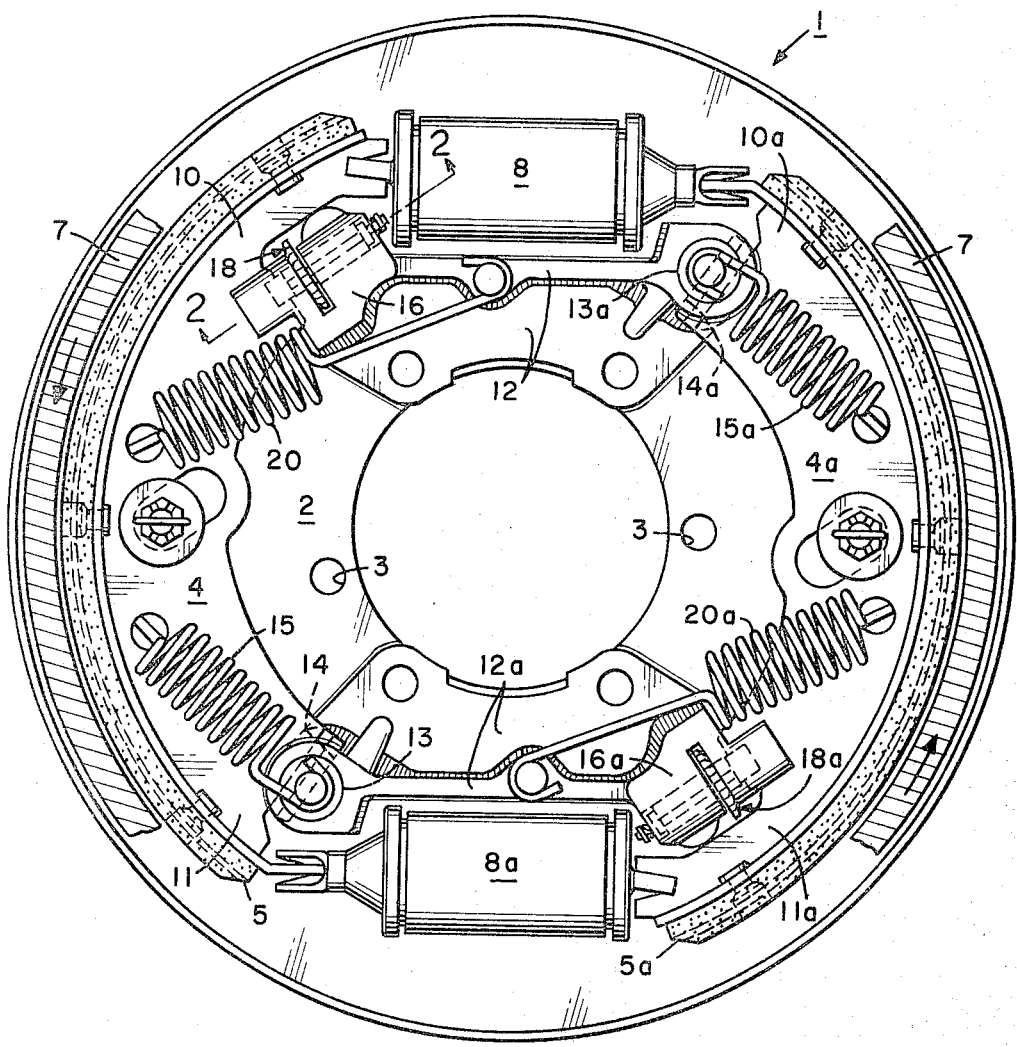

INVENTOR
PATRICK S. STELLA
BY
William R. O'Meara

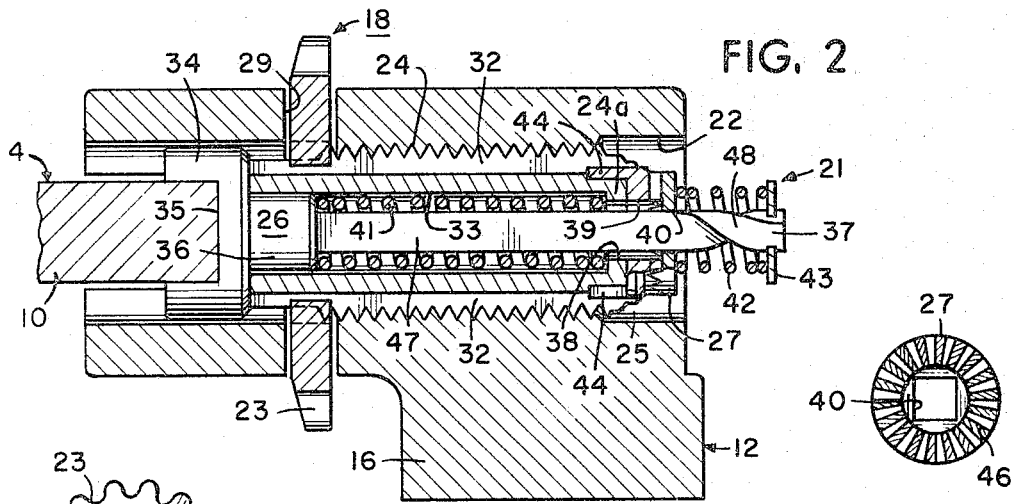
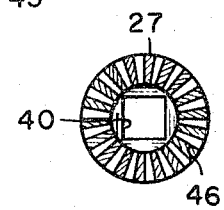
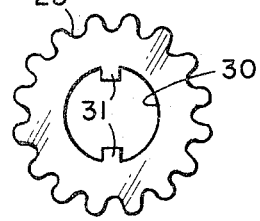
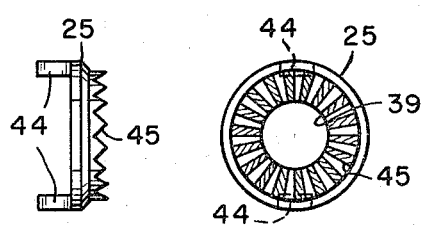
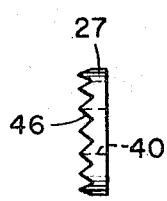
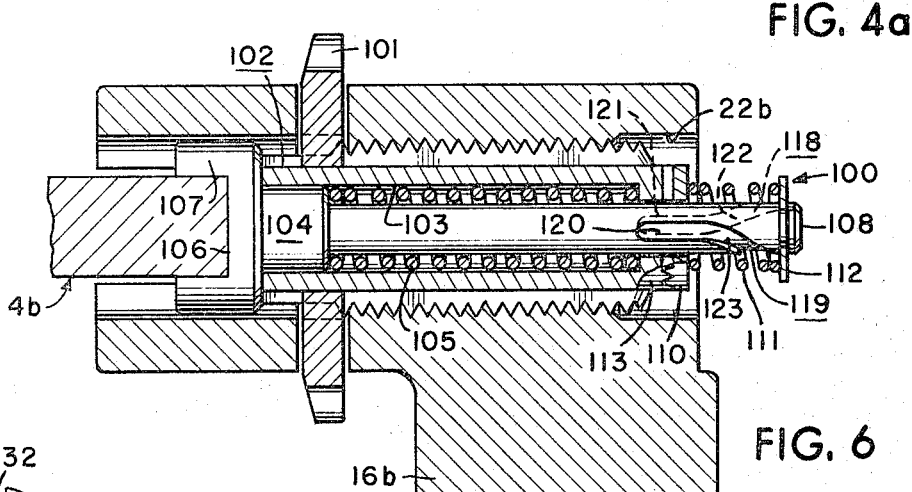
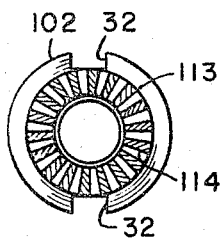
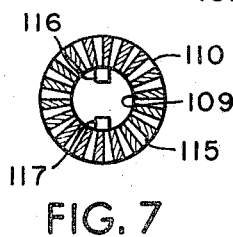

United States Patent Office 3,299,995
Patented Jan. 24, 1967

3,299,995
AUTOMATIC ADJUSTING MECHANISM
Patrick S. Stella, Olivette, Mo., assignor to Wagner Electric Corporation, St. Louis, Mo., a corporation of Delaware
Filed Dec. 24, 1964, Ser. No. 420,887
12 Claims. (Cl. 188—79.5)

This invention relates to automatic adjusting mechanisms and, more particularly, to an automatic adjusting mechanism for controlling the displacement of a friction member of a friction device.

It is a general object of the present invention to provide a novel automatic adjusting mechanism for maintaining the displacement between a movable friction member and another friction member cooperable therewith, substantially constant irrespective of friction member wear occasioned by frictional engagement between the friction members.

Another object of the present invention is to provide a novel adjusting means for automatically adjusting the retracted position of a friction member relative to a cooperating friction member for compensation for friction material wear on one of the friction members wherein the adjusting means is especially simple and rugged in construction and reliable in operation.

Another object is to provide an improved automatic adjusting mechanism for controlling the retracted position of a friction member of a friction device, such as a vehicle brake, for the purpose of compensating for friction material wear which can be readily manually adjusted to adjust the retracted position of the friction member when desired without requiring special means or special operations to permit such manual adjustment.

Another object is to provide a novel automatic adjusting mechanism for maintaining a predetermined clearance between a pair of coacting relatively displaceable friction members of a friction device which includes a pre-assembled unit which can be quickly and easily mounted in and removed from the friction device.

Another object is to provide an automatic adjusting mechanism for a friction device for adjustably controlling the retracted position of a friction member relative to a coacting member of the friction device which includes a pre-assembled unit without loose parts wherein handling and shipping thereof is facilitated.

Another object is to provide an automatic adjusting mechanism for automatically adjusting the retracted position of a friction member of a friction device which is relatively small in size and which can be installed in a friction device without the necessity of altering parts of the friction device.

Another object is to provide an automatic adjusting mechanism which includes a pre-assembled unit which can be readily substituted for a conventional manual adjusting member in an existing friction device.

These and other objects and advantages of the present invention will be apparent hereinafter.

Briefly, the present invention embodies adjustment means for a movable friction member of a friction device including extendable means supported in the friction device and defining the retracted position of the friction member, driving means engageable with the extendable means and rotatable to control the extension of the extendable means and the retracted position of the friction member, and other means engaged for concert movement with the friction member and drivingly engageable with the driving means to effect adjustable rotation of the driving means for extending the extendable means to adjust the retracted position of the friction member.

In the drawings which illustrate embodiments of the invention,

FIG. 1 is an elevational view of a friction device embodying the present invention, FIG. 2 is a greatly enlarged sectional view taken along the line 2—2 of FIG. 1 showing the automatic adjusting mechanism in cross-section according to one embodiment of the present invention, FIG. 3 is a plan view of the manual driving member of FIG. 2 on a reduced scale, FIG. 4 is a plan view of the drive gear means of the mechanism of FIG. 2, FIG. 4a is a right side view of the gear means of FIG. 4, FIG. 5 is a plan view of the driven gear means of the mechanism of FIG. 2, FIG. 5a is a left side view of the gear means of FIG. 5, FIG. 6 is a sectional view illustrating another embodiment of automatic adjustment means of the present invention, FIG. 7 is a plan view of the drive gear means of the mechanism of FIG. 6, and FIG. 8 is a right end view of the adjusting nut of FIG. 6.

Referring now to FIG. 1 in particular, a friction device or wheel brake assembly 1 is shown provided with supporting means or backing plate 2 having a plurality of centrally located mounting apertures 3 therein for connection with a vehicle axle flange (not shown). A pair of opposed radially displaceable members or brake shoes 4, 4a are slidably disposed on backing plate 2 having friction material or linings 5, 5a secured thereto, such as by the well-known method of bonding or by rivets as shown, the linings being adapted for frictional engagement with a relatively displaceable friction producing member or brake drum 7.

Actuator motors or wheel cylinders 8, 8a are diametrically and oppositely secured, such as by studs, on the backing plate 2 and are operatively connected with adjacent ends 10, 10a and 11, 11a of the brake shoes 4, 4a. Diametrically and oppositely disposed stationary supports or anchor brackets 12, 12a are also secured to the backing plate 2 between adjacent brake shoe ends 10, 10a and 11, 11a with the anchor brackets also adapted for fixed connection, along with the backing plate, to the non-rotatable vehicle axle flange (not shown). Rotatable anchor pins 13, 13a having radially extending anchoring surfaces 14, 14a are pivotally mounted in the anchor brackets 12, 12a, and return springs 15, 15a are connected between the brake shoes 4, 4a and anchor brackets 12, 12a to normally urge the brake shoe ends 11, 10a into respective sliding and pivotal anchoring engagement with the anchoring surfaces 14, 14a. Anchor brackets 12, 12a are also provided with integral portions or housings 16, 16a, and adjustable anchor means or adjustment mechanisms, indicated generally at 18, 18a, are operatively positioned in the anchor bracket housings 16, 16a. A pair of return springs 20, 20a are connected between the brake shoes 4, 4a and the anchor brackets 12, 12a, respectively, to normally urge the brake shoe ends 10, 11a into respective engagement with the adjustable anchor mechanisms 18, 18a. When the drum 7 is rotating in the forward direction, as indicated by the directional arrow, the brake shoe ends 10a and 11 are the anchoring ends, and the brake shoe ends 10 and 11a are the unanchored or displaceable ends. However, when the drum 7 is rotating in the reverse direction opposite to the directional arrow, the anchoring and displaceable ends of the brake shoes are also reversed, that is, the brake shoe ends 10 and 11a become the anchor ends and brake shoe ends 10a and 11 become the displaceable ends.

The automatic adjustment mechanisms 18, 18a, with which the present invention is primarily concerned, are identical in construction and operation except that mechanism 18 automatically adjusts the retracted position of shoe 4 to compensate for wear of lining 5 while mechanism 18a automatically adjusts the retracted position of shoe 4a to compensate for wear of lining 5a. For this reason, only mechanism 18 is shown and described herein in detail.

As seen in FIG. 2, the adjustment mechanism 18 includes a pre-assembled automatic adjustor unit 21 disposed in a threaded bore 22 in the housing 16 of bracket 12 for automatically adjusting the retracted position of brake shoe 4, and a driving or starwheel member 23 for manually adjusting the retracted position of shoe 4. The adjustor unit 21 includes an adjustable anchor member or extendable, externally threaded adjusting nut or housing 24 threadedly received in the bore 22 having driven gear means or a ratchet wheel member 25 thereon for concert movement therewith, a resiliently urged follower member or push rod 26 adapted for concert movement with end 10 of shoe 4, and annular drive gear means or ratchet wheel member 27 on the push rod 26 adapted for driving engagement with the ratchet wheel member 25 for rotating the adjusting nut 24 in response to a predetermined axial movement of push rod 26 for adjusting the retracted position of shoe 4. The starwheel member 23 is disposed in a slot 29 which intersects bore 22 in bracket housing 16, and is provided with an opening, indicated at 30 in FIG. 3, through which the adjusting unit 21 extends, the diameter of opening 30 being of sufficient size relative to nut 24 to permit free axial movement of the adjusting nut 21 relative to the starwheel member 23. The starwheel member 23 is also provided with a pair of opposed radially inwardly extending keys 31 which extend into a pair of axially extending opposed keyways 32 in nut 24 and serve to rotate the adjustor unit 21 when starwheel member 23 is manually rotated to adjust the retracted position of the shoe 4.

The push rod 26 is slidably disposed in a bore 33 formed in the adjusting nut 24 and includes a head portion 34 external of the nut 24 having a diametrically extending cross-slot 35 which receives the shoe end 10, an annular guide portion 36 integrally connected to and of smaller diameter than head 34 and which is slidably disposed in bore 33 to guide the push rod for axial movement, and a spiral rod or stem 37 connected to the guide portion 36. The stem 37 extends through an opening 38 in the right end of nut 24, an annular opening 39 in driven gear 25, and a rectangular opening 40, as seen in FIG. 4, in drive gear 27. The push rod 26 is resiliently urged toward engagement with shoe end 10 by a compressive spring 41 disposed in bore 33 between the inner end of guide portion 36 and an annular flange 24a integral and adjacent the right end of the nut 24. Push rod 26 moves in concert with shoe 10 but cannot rotate due to the engagement between the opposed side walls of cross-slot 35 and the shoe end 10. A compressive spring 42 is disposed on the right end of the stem 37 externally of the nut 24 between the drive gear 27 and a spring retainer or snap ring 43 secured to the stem 37 to normally urge the drive gear 27 into engagement with the driven gear 25. The driven gear 25 is connected to the right end of nut 24 for concert rotation therewith by providing a pair of integral axially extending keys or tabs 44 which extend into keyways 32 in the nut 24. Driven gear 25, which is shown also in FIGS. 5, 5a, is coaxial with drive gear 27 and is provided with axially extending, circumferentially spaced gear or ratchet teeth 45 which mesh with axially extending, circumferentially spaced gear or ratchet teeth 46 on drive gear 27, as seen also in FIGS. 4 and 4a. Where desired, the driven gear 25 may be formed integrally with the nut 24, such as by forming gear teeth in the right end wall thereof which are complementary to the teeth 46 on gear 27.

The stem 37 of push rod 26 has a straight portion 47, and a driving or spiral portion 48 between the drive gear 27 and right end of the stem. Stem 37 is rectangular in cross-section and complementary in configuration to the rectangular opening 40 in the drive gear 27. The spiral side walls of spiral portion 48 cooperate with the radially inner periphery or walls defining the opening 40 in drive gear 27 to translate linear or axial displacement movement of the push rod 26 and shoe 4 into rotary movement of the drive gear 27, driven gear 25, and nut 24 to adjust the retracted position of the shoe 10, as will be explained in greater detail hereinafter. The stem 37 may be formed, for example, from a straight metal bar of rectangular cross-section by suitably twisting the bar to provide the spiral end portion 48.

In FIG. 2, the head 34 of the push rod 26 is urged against the left end of nut 24 by the force of shoe return spring 20 acting on shoe 4 to define the retracted position of the shoe and push rod 26. When the push rod 26 is in the retracted position, the drive gear 27 is on the straight portion 47 of the stem and the start of the spiral portion 48 is slightly axially spaced a predetermined distance from gear 27, and this provides a certain amount of lost motion between the gear 27 and push rod 26. Also, additional lost motion may result from "play" or clearance between the walls of opening 40 and the stem 37 which permits a slight amount of relative rotation between the stem and drive gear 27. Thus, if the push rod 26 moves leftwardly from the position shown in FIG. 2, the straight portion 47 will first move through opening 40 without effecting rotation of gear 27, and then, upon further movement of push rod 26 a sufficient amount to take up any lost motion, the spiral portion 48 will move through opening 40 causing drive gear 27 to follow the spiral portion 48 and thereby rotate gear 27 in one direction. If the push rod 26 now moves rightwardly the spiral portion 48 will cause the gear 27 to rotate in the reverse direction and return it to the position shown in FIG. 2. The direction of the spiral portion 48 is such that when the spiral portion moves leftwardly in opening 40, as viewed in FIG. 2, the gear 27, as it is rotated, is urged toward driving engagement with driven gear 25 to rotate gear 25 in one direction. On the other hand, when the spiral portion 48 is moving rightwardly in opening 40, the gear 27, as it rotates in the opposite direction, is urged by the spiral portion outwardly or in a direction away from driven gear 25 against the force of spring 42 without rotating the driven gear 25 and nut 24 in the opposite direction because any driving force applied to the driven gear 25 by the drive gear 27 is relatively slight for this direction of rotation and insufficient to overcome the inherent friction between the threads of nut 24 and the bracket housing 16.

In describing the operation of the automatic adjustment mechanism 18, it will first be assumed that there is a desired predetermined minimum amount of clearance between the drum 7 and lining 5 of brake shoe 4 and the drum is rotating in the forward direction so that end 10 is the displaceable end of shoe 4. When the wheel cylinders 8, 8a are energized, such as by transmitting fluid pressure thereto from a source of fluid pressure, for example, a master cylinder or the like (not shown), actuating forces are established which effect displacement movement of the brake shoes 4, 4a into frictional engagement with the drum 7 to thereby effect energization of the brake 1. During the above-mentioned displacement movement of shoe 4, the force of spring 41 causes the push rod 26 to follow the shoe 4; however, the displacement movement of the push rod 26 will be insufficient to effect rotation of the adjusting nut 24 due to the lost motion between the push rod and the drive gear 27. If now the brake 1 is de-energized, such as by exhausting the fluid pressure in the wheel cylinders 8, 8a, the shoe return spring 20 will effect retractile movement of the shoes 4, 4a to the retracted position thereof and return the push rod 26 to the position shown in FIG. 2 and without having rotated driven gear 25.

As the friction lining 5 wears due to the frictional engagement thereof with the rotatable drum, the displacement movement of the shoe 4 and the push rod 26 increases because of the increase in the shoe clearance as a result of lining wear. As the shoe clearance slowly increases, the spiral portion 48 eventually enters the opening 40 during a displacement movement of the push rod 26 and effects rotation of drive gear 27 in one direction a slight amount which, in turn, rotates driven gear 25 and adjusting nut 24 a slight amount. This rotation of nut 24 is in a direction causing a slight axial or longitudinal advance movement thereof in a direction toward the drum, thus effecting a slight adjustment of the retracted position of shoe 4 in a direction tending to reduce the clearance between the lining 5 and drum 7. Because the effective gear or thread ratio between the threads on adjusting nut 24 and the spiral portion 48 is such that the displacement advance of the push rod 26 is greater than the axial advance of the nut 24, this above-mentioned rotation and axial advance of the nut 24 does not fully compensate for the amount of increase in shoe clearance; however, such increase in shoe clearance is extremely small. On the return or retractile stroke of the push rod 26, the spiral portion 48 will effect return rotation of the drive gear 27 to its original position shown in FIG. 2. During this return stroke, the spiral portion 48, as it moves in opening 40, will cause the drive gear 27 to become slightly out of mesh with driven gear 25 since gear 25 was slightly rotated from its original position, but because of "play" between the straight portion 47 of the push rod 26 and drive gear 27, the drive gear will usually be in full mesh with the gear 25 in the retracted position. The above slight amount of rotation of adjusting nut 24 increases the effective lost motion between the push rod 26 and the nut 24 so that further wear must take place before the push rod 26 can effect further rotation of nut 24. As the lining 5 continues to wear, the displacement stroke of the push rod 26 will increase and effect further rotation of the adjusting nut 24 in the above-described manner to limit increasing shoe clearance until the nut 24 has been rotated to such an extent that the drive gear 27, on one of the retraction strokes of the push rod 26, is indexed over the driven gear 25 by the spiral portion 48. Upon indexing, the drive gear 27 will be in full mesh with driven gear 25 in the retracted position but with driven gear 25 angularly displaced from its original position relative to drive gear 27 a distance equal to the angular distance between two adjacent teeth. At this time there will be a predetermined maximum amount of shoe clearance but the increase in lost motion due to the above-mentioned rotation of the nut 24 is taken up as a result of the above indexing of gear 27. On the next displacement stroke of the shoe end 10 and push rod 26 immediately following the last named retraction stroke that effected indexing of the drive gear 27, the push rod 26 rotates the drive gear 27 which, in turn, rotates the driven gear 25 and nut 24 sufficiently to compensate for the wear of lining 5 or return the clearance between the lining 5 and drum back to its minimum limit. With the clearance between the lining 5 and drum 7 at a minimum, no further adjustment of nut 24 will take place during subsequent brake applications until further lining wear occurs.

It is to be noted that as the clearance between shoe 4 and the drum 7 increases from the predetermined minimum limit prior to the amount of wear necessary to effect the above-mentioned indexing of the drive and driven gears 25 and 27, the adjustments of the nut 24 reduce or limit the rate of increase in clearance to lining wear. Because of this reduction in the rate of increase in clearance to lining wear, the adjustor 21 maintains the difference between the minimum and maximum shoe clearances extremely small. Thus, in the case of a vehicle brake utilizing a master cylinder, the foot pedal stroke, for a given amount of lining wear, is less than where no automatic adjustment means are used or where the vehicle brakes are equipped with known prior art automatic adjustment means which do not effect any adjustment until a predetermined maximum amount of shoe clearance is reached.

The brake shoe clearance can be manually adjusted, such as when installing new brake shoes, by manually rotating the starwheel 23 which, in turn, rotates adjusting nut 24. Since the drive gear 27 is on the straight portion 47 and slightly spaced from the spiral portion 48 of stem 37 when the brake shoe 4 is in the retracted position, the drive gear 27 will be able to move axially on the straight portion 47 against the force of spring 42 upon manual rotation of nut 24 to thereby permit rotation of the nut 24 and gear 25 in either direction relative to gear 27. In other words, when the adjusting nut is manually rotated in either direction, the teeth on gear 25 will slip by the teeth on gear 27 since the gear 27 is able to move axially on the straight portion 47 without being rotated into locking engagement with gear 25 by the spiral portion 48 since the spiral portion is spaced from the drive gear 27 in the retracted position of the brake shoe 4.

The automatic adjustor unit 21 is a preassembled unit which can be readily installed in the housing 16 before shoe 4 is attached without any alteration of brake parts. Unit 21 may be installed simply by placing the starwheel member 23 in slot 29 and inserting the unit 21 into the bore 22 so that the keyways 32 receive the keys 31 of the starwheel member. The brake shoe 4 may then be assembled in the friction device and the adjustor unit 21 manually adjusted in the manner previously discussed herein to provide the desired shoe clearance. Also, in many cases, the adjustor unit 21 may be used to replace conventional manual adjusting nuts in existing friction devices simply by removing the conventional adjusting nut and replacing it with the unit 21. It will also be apparent that the adjustor unit 21, because it is a preassembled unit, can be readily packaged and shipped. Furthermore, neither the brake applying forces nor the shoe anchoring forces are applied to or transmitted through the driven and drive gears 25 and 27 of the illustrated adjustor unit 21; thus, these gears, as well as other parts of the adjustor unit, can be economically made relatively small.

There is shown in FIG. 6 a modified automatic adjustor unit 100 disposed in a threaded bore 22b in a housing 16b of a bracket 12b adapted for connection to a fixed part of a brake and a starwheel member 101 for manually adjusting the retracted position of a brake shoe 4b. Adjustor unit 100 includes an extendable member or adjusting nut 102 having a bore 103 in which a follower member of push rod 104 is slidably disposed. The push rod 104 is resiliently urged by a spring 105 disposed in bore 103 for following movement with a displaceable end of shoe 4b which is received in a cross-slot 106 in an enlarged head portion 107 of the push rod 104. The push rod 104 is provided with an annular stem 108 which extends through the right end of nut 102, and an opening 109 in a drive gear 110, as shown more clearly in FIG. 7. A spring 111 is disposed on the stem 108 between a spring retainer or snap ring 112 and the drive gear 110 to resiliently urge the drive gear into engagement with driven gear means 113 on the right end of the adjusting nut 102. The driven gear means 113 is shown as an integral portion of nut 102 and includes a plurality of gear teeth 114 integrally formed in the right end wall of nut 102, as seen in FIG. 8, which mesh with gear teeth 115 on drive gear 110.

The drive gear 110 is formed with a radially inner periphery to provide a pair of diammetrically opposed keys 116 and 117 extending radially inwardly of the gear. The keys 116 and 117 respectively slide in a pair of diametrically opposed grooves or keyways 118 and 119 formed in the stem 108 whereby axial movement of the push rod 104 is translated into rotary movement of the drive gear 110. The keyways 118 and 119 have straight axially extending portions 120 and 121, respectively, and spiral portions 122 and 123, respectively.

The brake shoe 4b is shown in the retracted position in FIG. 6, with push rod head portion 107 urged into engagement with the left end of adjusting nut 101 which defines the retracted position of the shoe 4b. In the retracted position, the keys 116 and 117 of the drive gear 110 are respectively disposed in the straight portions 120 and 121 of the keyways so that it is possible to manually adjust nut 102 since the drive gear 110 will be able to slide axially away from the teeth 114 on the nut 102 in response to a manually applied rotary force on starwheel member 101.

Operation of the adjustor unit 100 is similar to the operation of adjustor unit 21. Assuming first that the clearance between the friction lining of shoe 4b and drum 7 is at the desired predetermined minimum amount, the push rod 104 will follow the shoe 4b during the displacement and retractile movements thereof without effecting rotation of the drive gear 110 and without adjusting nut 102 because of a certain amount of lost motion between rod 104 and drive gear 110 as a result of straight portions 120 and 121 of the keyways 118 and 119 and any "play" between the keys 116 and 117 and keyways 118 and 119. As the lining of shoe 4b wears, the displacement or leftward movement of the push rod 104 from its retracted position will eventually become great enough such that the walls of spiral portions 122 and 123 will engage the side walls of keys 116 and 117 so that the spiral side walls of the keyways 118 and 119 effect rotation of the drive gear 110 and and nut 102 in one direction to adjust the nut 102 toward the drum. On the retractile or rightward stroke of the rod 104, the drive gear 110 will rotate a slight amount in the opposite direction without rotating the nut 102 in the opposite direction since the friction between the threads on nut 102 and housing 16b is greater than that between the gear 110 and teeth 114 on gear means 113 when the rod 104 moves rightwardly and rotates the gear 110. As the lining continues to wear, the nut 102 will continue to be adjusted but with the clearance between the lining of shoe 4b and drum increasing since the axial advance or displacement movement of the push rod 104 is greater than the axial advance of the nut 102 because of the effective thread ratio between the threads on nut 24 and the spiral portions 122 and 123. After the shoe lining has worn such that the shoe clearance reaches its maximum permissable amount, the push rod 104 during a retractile stroke effects rotation of the drive gear 110 so that it is indexed over the teeth 114 and is again in mesh with teeth 114 but angularly displaces one tooth relative to its original position with respect to the teeth 114. On the next brake application or displacement stroke of the push rod 104, the drive gear 110 will rotate the nut 102 sufficiently to compensate for the increased clearance so that the clearance will return to the minimum desired amount.

It is now apparent the novel automatic adjustment means meeting the objects set out hereinabove are provided and that changes and modifications in the disclosure may be made by those skilled in the art without departing from the spirit and scope of the invention as defined by the claims which follow.

The embodiments of the invention in which an exclusive property or privilege is claimed are defined as follows:

1. In a friction device having a friction member movably between a retracted position and an extended position in frictional engagement with a coacting member, adjustable means supported for rotational and linear movement on said friction device and defining a retracted position for said friction member, and motion translating means including other means engaged with said friction member for concerted following movement therewith relative to said adjustable means, rotatable drive means on said other means and drivingly engaged with said adjustable means to effect the rotational and linear movement thereof, and said other means including a driving portion drivingly engaged with said drive means to translate the friction member following movement of said other means into adjustable rotation of said drive means and adjustable means, said adjustable means being linearly movable relative to said friction device in response to the adjusting rotation thereof to adjust the retracted position for said friction member.

2. In a friction device having a friction member movable between a retracted position and a displaced position in frictional engagement with a coacting member, extendable means supported on said friction device for rotational and linear movement relative thereto and defining a retracted position for said friction member, driven means on said extendable means, motion translating means including follower means engaged with said friction member for concerted following movement therewith and for linear movement relative to said extendable means, rotatable drive means, means defining a drive connection between said drive means and said driven means, said follower means having a portion thereof drivingly engageable with said drive means to translate the following movement of said follower means into concerted rotation of said drive and driven means through said drive connection and adjustably rotate said extendable means, said extendable means being linearly movable on said friction device in response to the adjusting rotation thereof to re-define the retracted position for said friction member.

3. In a friction device having a friction member for displacement movement from a retracted position toward an extended position in frictional engagement with a coacting member, support means, an adjustable anchor member for said friction member connected to said support means for rotation and longitudinal displacement relative thereto when rotated and adjustably defining a retracted position for said friction member, said anchor member having an axially extending bore therein, and motion translating means including other means mounted for axial movement in said bore and engaged for concerted displacement movement with said friction member relative to said anchor member, and rotatable drive means drivingly engaged with said anchor member to drivingly rotate and longitudinally displace said anchor member, said other means having a spiral portion thereon movable relative to and drivingly engageable with said drive means to translate the axial movement of said other means into adjustable rotation of said drive means and anchor member to effect longitudinal displacement of said anchor member relative to said support means and adjustably re-define the retracted position for said friction member in response to the displacement movement of said friction member in excess of a predetermined amount.

4. In a friction device having a friction member movable between a retracted position and a displaced position in frictional engagement with a coacting member, extendable means supported on said friction device for adjusting rotational and linear movement and defining a retracted position for said friction member, and motion translating means including follower means engaged for concerted movement with said friction member and relative to said extendable means, rotatable drive means disposed on said follower means in rotatable driving engagement with said extendable means and having a surface defining an opening therethrough, and a spiral wall portion on said follower means for driving engagement with said surface, said spiral wall portion being movable in response to the following movement of said follower means into driving engagement with said surface to effect rotation of said drive means and concerted adjusting rotation of said extendable means, said extendable means being linearly movable in response to the adjusting rotation thereof relative to said friction device to re-define the retracted position of said friction member in response to movement of said friction member.

5. In a friction device having a friction member movable between a retracted position and a displaced position in frictional engagement with a coacting member, defining the retracted position for said friction member, said extendable means being extendable means rotatably supported on said friction device and extendable relative thereto when rotated to adjust the retracted position of said friction member, driven gear means on said extendable means for concerted rotation therewith, and motion translating means including a follower member extending through said extendable means and movably relative thereto, resilient means urging said follower member toward following engagement with said friction member to effect concerted movement of said follower member with said friction member, and rotatable drive means disposed on said follower member in driving engagement with said driven gear means, and said follower member including a driving portion drivingly engaged with said rotatable drive means and movable relative thereto to translate the following movement of said follower member into rotation of said drive means, said driven gear means, and said extendable means to extend said extendable means relative to said friction device and thereby adjust the retracted position of said friction member.

6. In a friction device having a friction member for movement between a retracted position and an extended position in frictional engagement with a coacting member, support means, an adjustable anchor member for said friction member rotatably supported on said support means for longitudinal displacement relative thereto when rotated to adjust the retracted position of said friction member, a manually rotatable member drivingly engaged with said anchor member, said rotatable member being manually movable to drivingly rotate said anchor member to effect the longitudinal displacement thereof relative to said support means for manually adjusting the retracted position of said friction member, and motion translating means including follower means longitudinally displaceable relative to said anchor member and engaged for concerted following movement with said friction member, and rotatable drive means disposed on said follower means and drivingly engaged with said anchor member to drivingly rotate and longitudinally displace said anchor member, said follower means having an axially extending straight portion and a portion with spiral wall means thereon, said follower means being longitudinally displaceable relative to said drive means to effect driving engagement between said spiral portion and said drive means to translate the longitudinal displacement of said follower means into adjustable rotation of said drive means and anchor member to longitudinally displace said anchor member relative to said support member and adjust the retracted position of said friction member, said drive means being non-rotatably disposed on said straight portion with said driving portion spaced from said drive means when said friction member is in the retracted position to allow movement of said drive means toward a position out of driving engagement with said anchor member in response to the manual rotation of said manually rotatable member to permit manual adjustment of said anchor member and the retracted position of said friction member.

7. In a friction device having a friction member for displacement and retractile movement between a retracted position and a displaced position in frictional engagement with a coacting member, a support having a threaded opening therein, a rotatable adjusting member threadedly received in said opening and extendable relative to said support member upon rotation, driven gear means on said adjusting member rotatable in concert therewith to control the extension of said adjusting member relative to said support means for adjusting the retracted position of said friction member, and motion translating means including a follower member movable relative to said adjusting member, resilient means for urging said follower member into following engagement with said friction member, said follower member being engageable with said adjusting member to define the retracted position of said friction member, and rotatable drive means having a surface defining an opening therethrough, and key means on said drive means extending into said opening, said drive means being disposed on said follower member in driving engagement with said driven gear means, said follower member extending through said opening in said drive means and having a spiral groove therein movable into said opening in said drive means and adapted to receive said key means to effect rotation of said drive means, said follower member being movable in response to movement of said friction member in excess of a predetermined amount to move said spiral groove in said opening in said drive means to rotate said drive means and said driven gear means to extend the adjusting member and adjust the retracted position of said friction member.

8. An automatic adjuster assembly for use in a friction device having a friction member mounted for movement from a retracted position to an extended position in frictional engagement with a coacting member, and a fixed support member having a threaded opening therein, said adjustor assembly comprising an externally threaded adjusting nut adapted to be threadedly received in said opening, said nut having a bore therein and driven gear means thereon, an elongated follower member mounted for axial movement in said bore and having an end portion adapted for engagement with said friction member and said adjusting nut to define the retracted position of said friction member, first resilient means disposed in said bore for urging said follower member into following engagement with said friction member, rotatable drive means on said follower member coaxial with said driven gear means and having a radially inner peripheral surface defining an opening therethrough, and second resilient means on said follower member normally resiliently urging said drive means toward engagement with said driven gear means, said follower member extending through said opening in said drive means and movable relative thereto, said follower member having a spiral portion thereon movable in said opening in said drive means into sliding engagement with said inner peripheral surface to effect rotary movement of said drive means, said driven gear means, and said adjusting nut to move said adjusting nut axially in said threaded opening for adjusting the retracted position of said friction member in response to movement of said follower member in excess of a predetermined amount.

9. In a friction device having a movably mounted friction member, a rotatable coacting member, actuating means engaged with said friction member for displacing said friction member from a retracted position to a displaced position in frictional engagement with said coacting member, and return spring means connected to said friction member for moving said friction member from engagement with said coacting member to the retracted position, automatic adjustment means for maintaining the displacement movement of said friction member relative to said coacting member between predetermined minimum and maximum limits irrespective of friction member wear occasioned by said frictional engagement comprising support means, adjustable anchor means for said friction member connected to said support means for rotation and longitudinal displacement relative thereto when rotated for adjusting the retracted position of said friction member, motion translating means including follower means engaged with said friction member for following movement in concert therewith relative to said anchor means, driven gear means on said anchor means rotatable in concert therewith, and rotatable drive means drivingly engaged with said driven gear means, said follower means having a driving portion thereon movable therewith in one direction into driving engagement with said drive means when the friction member displacement increases above said predetermined minimum limit as a result of friction member wear to effect limited rotation of said drive means and said driven means in one direction to rotate said anchor means and adjust the retracted position of said friction member to thereby limit increasing friction member displacement as said friction member wears, said driving portion drivingly engaging said drive means in response to movement thereof in the opposite direction after said friction member displacement reaches said predetermined maximum limit to index said drive means relative to said driven gear means so that upon subsequent movement of said drive portion in said one direction thereof said drive portion effects rotation of said drive means and said driven gear means in said one direction of rotation thereof to adjust the retracted position of said friction member to return said friction member displacement to said predetermined minimum limit.

10. In a brake having a movably mounted friction member with friction lining thereon, a rotatable coacting member, actuating means engaged with said friction member for displacing said friction member in a brake energizing direction from a retracted position to a displaced position wherein said lining frictionally engages said coacting member, and return spring means connected to said friction member for moving said friction member in a brake de-energizing direction from engagement with said coacting member to the retracted position, automatic adjustment means for maintaining the displacement of said friction member relative to said coacting member between predetermined minimum and maximum limits irrespective of wear of said friction lining occasioned by said frictional engagement comprising support means, adjustable anchor means for said friction member having an axial bore therein and connected to said support for rotation and longitudinal displacement relative thereto when rotated for adjusting the retracted position of said friction member, motion translating means including an elongated follower member engaged with said friction member and mounted for linear movement in said bore, spring means in said bore normally urging said follower member toward engagement with said friction member to effect concert movement thereof with said friction member, driven gear means on said anchor means rotatable in concert therewith, and rotatable drive means having a radially inner surface defining an opening therethrough and disposed on said follower member and normally indexed with said driven gear means for rotating said driven gear means and said anchor means, said follower member having spiral wall means thereon movable therewith in said opening and into driving engagement with said radially inner surface in response to movement of friction member in the brake energizing direction when the friction member displacement increases above said predetermined minimum limit as a result of friction lining wear to effect limited rotation of said drive means and said driven gear means in one direction to rotate said anchor means and adjust the retracted position of said friction member to thereby limit the friction member displacement as said friction lining wears, said spiral wall means drivingly engaging said drive means to rotate said drive means in the reverse direction in response to movement of said friction member in a brake de-energizing direction after said friction member displacement reaches said predetermined maximum limit to index said drive means relative to said driven gear means so that upon subsequent movement of said friction member in the brake energizing direction said spiral wall means effects rotation of said drive means and said driven gear means in said one direction of rotation thereof to adjust the retracted position of said friction member to return the friction member displacement to said predetermined minimum limit.

11. In a brake assembly having a friction member for displacement and retractile movement between a retracted position and a displaced position in frictional engagement with a coacting member, stationary support means having a threaded opening therein, an externally threaded adjusting nut threadedly received in said opening and having a bore therein, driven gear means connected to one end of said adjusting nut, an elongated follower member extending through said bore having one end portion thereof engaged with said friction member, resilient means in said bore urging said follower member toward said friction member for concert movement therewith, said one end portion of said follower member being engageable with the other end of said adjusting nut to define the retracted position of said friction member, and a rotatable gear driving member having a radially inner surface defining an opening therethrough, said driving member being disposed on the opposite end portion of said follower member externally of said bore and coaxially with said driven gear means, other resilient means on said opposite end portion of said follower member normally resiliently urging said driving member into driving engagement with said driven gear means, said follower member extending through said opening in said driving member and having spiral wall means thereon movable in said opening in said driving member into sliding engagement with said inner surface to effect rotation of said driving member and said driven gear means in one direction and extend said adjusting member to adjust the retracted position of said friction member in response to a predetermined amount of movement of said friction member in one direction, said spiral portion drivingly engaging said inner surface to effect reverse rotation of said drive gear means relative to said driven gear means in response to movement of said friction member in the opposite direction subsequent to said rotation of said driven gear means in said one direction.

12. In a friction device having a friction member for movement between a retracted position and a displaced position for frictional engagement with a coacting member, adjustable means supported on said friction device for rotational and linear movement relative thereto and defining a retracted position for said friction member, and motion translating means including rotatable drive means drivingly engaged with said adjustable means to effect the rotational and linear movement thereof, means linearly movable relative to said adjustable means for following engagement with said friction member, and other means movable relative to and drivingly engaged with said rotatable drive means to translate the linear following movement of said last named means into adjustable rotation of said rotatable drive means and adjustable means, said adjustable means being linearly movable relative to said friction device to adjust its retracted position in response to the adjusting rotation thereof.

References Cited by the Examiner

UNITED STATES PATENTS

| | | | |
|---|---|---|---|
| 1,817,081 | 8/1931 | Jonas | 188—196 |
| 3,115,955 | 12/1963 | Knocke | 188—196 |

References Cited by the Applicant

UNITED STATES PATENTS

| | | |
|---|---|---|
| 1,613,778 | 1/1927 | Worden. |
| 2,130,875 | 9/1938 | Colman. |
| 2,695,078 | 11/1954 | Brooks. |
| 2,730,205 | 1/1956 | Bauman. |
| 2,748,901 | 6/1956 | Brooks. |
| 2,774,445 | 12/1956 | Pontius. |
| 2,788,095 | 4/1957 | Brooks. |
| 2,818,143 | 12/1957 | Phillips. |
| 2,938,610 | 5/1960 | Dombeck. |

DUANE A. REGER, *Primary Examiner.*